(12) United States Patent
Plachetta et al.

(10) Patent No.: US 7,820,757 B2
(45) Date of Patent: Oct. 26, 2010

(54) PRODUCTION OF A TITANIA-PIGMENTED POLYAMIDE

(75) Inventors: Christoph Plachetta, Limburgerhof (DE); Manfred Heckmann, Kuantan (MY); Hans-Harald Hünger, Ellerstadt (DE); Robert Weiβ, Kirchheim (DE)

(73) Assignee: BASF SE, Ludwigshafen (DE)

( * ) Notice: Subject to any disclaimer, the term of this patent is extended or adjusted under 35 U.S.C. 154(b) by 957 days.

(21) Appl. No.: 10/532,597

(22) PCT Filed: Oct. 18, 2003

(86) PCT No.: PCT/EP03/11574

§ 371 (c)(1), (2), (4) Date: Apr. 25, 2005

(87) PCT Pub. No.: WO2004/037908

PCT Pub. Date: May 6, 2004

(65) Prior Publication Data

US 2006/0047057 A1 Mar. 2, 2006

(30) Foreign Application Priority Data

Oct. 24, 2002 (DE) ................................ 102 49 797

(51) Int. Cl.
C08G 69/26 (2006.01)
C08G 73/10 (2006.01)
C08K 3/22 (2006.01)
C08K 3/18 (2006.01)
B01F 15/02 (2006.01)
B01F 7/00 (2006.01)

(52) U.S. Cl. ........................ 524/606; 524/497; 524/430; 524/879; 524/847; 366/181.4; 366/306; 366/307; 366/279; 366/315

(58) Field of Classification Search ................. 524/497, 524/430, 879, 606, 847; 366/181.4, 264, 366/304, 306, 307, 297, 315
See application file for complete search history.

(56) References Cited

U.S. PATENT DOCUMENTS 4,388,425 A * 6/1983 Strehler et al. .............. 523/333
4,474,681 A * 10/1984 Belde et al. .................... 516/90
4,710,535 A 12/1987 Perrot et al.
4,879,120 A * 11/1989 Wehr ........................... 524/430
5,540,499 A * 7/1996 Seeger ...................... 366/181.4
2003/0107948 A1 6/2003 Jacob

FOREIGN PATENT DOCUMENTS

WO WO-A 01/087474 11/2001

OTHER PUBLICATIONS

Richard J. Lewis, Sr. "Hawley's Condensed Chemical Dictionary, 13th Edition", John Wiley & Sons, Inc., New York pp. 703 (1997).*
Fourne, Synthetische Fasern, Carl Hanser Verlag München Wien 1995, S. 629-630.

* cited by examiner

*Primary Examiner*—Vasu Jagannathan
*Assistant Examiner*—Alexander C Kollias
(74) *Attorney, Agent, or Firm*—Connolly Bove Lodge & Hutz LLP

(57) ABSTRACT

Disclosed is a method for producing a polyamide containing titanium dioxide pigments. Said method is characterized by the fact that titanium dioxide pigments are dispersed in an initial mixture containing water and caprolactam by means of a device comprising a dispersion chamber, a disk-shaped rotor that is disposed inside said dispersion chamber, a stator that is provided with radial openings, is arranged within the dispersion zone of the dispersion chamber, and is connected to the rotor, a substance inlet located on each side of the rotor, preferably with a respective axial duct section such that the two flows of substance are combined in the peripheral edge area of the rotor disk, and a product outlet which is placed on the outer edge of the dispersion zone of the dispersion chamber, by feeding the titanium dioxide pigments to the dispersion chamber through one of said substance inlets while feeding the initial mixture containing water and caprolactam to the dispersion chamber through the other of said substance inlets, whereby a product mixture containing water, caprolactam, and the used titanium dioxide pigment is obtained via the product outlet, and the product mixture is polymerized so as to obtain a polyamide containing titanium dioxide pigments. Also disclosed are polyamides obtained according to the inventive method and the use of such polyamides as a masterbatch.

15 Claims, No Drawings

PRODUCTION OF A TITANIA-PIGMENTED POLYAMIDE

CROSS REFERENCE TO RELATED APPLICATION

The present application is a National Stage application of PCT/EP2003/011574, filed Oct. 18, 2003, which claims priority from German Patent Application No. DE 102 49 797.4, filed Oct. 24, 2002.

The present invention relates to a process for preparing a polyamide containing titania (titanium dioxide) pigments, polyamides obtainable by such a process and the use of such polyamides as a masterbatch for coloration or delustering polymers.

The use of titanium dioxide to deluster or color polyamides is common knowledge.

It is generally desirable for this use that the titanium dioxide be present in a very finely and uniformly divided form and the polyamides obtained by coloration or delustering with titanium dioxide have very low abrasivity due in particular to the titanium dioxide pigments in the course of further processing, for example spinning.

Various techniques are known for introducing titanium dioxide pigments into a polyamide.

For instance, Fourné, Synthetische Fasern, Carl Hanser Verlag, Munich-Vienna, 1995, pages 629-630, chapters 6.8 and 6.8.1, describes the addition of titanium dioxide at the start of the polymerization or the addition of a masterbatch, ie a polyamide having a high titanium dioxide content, to the substantially titanium dioxide-free main stream to be polymerized, for the purposes of delustering polyamides.

EP-A-70 452 discloses kneading the titanium dioxide into caprolactam followed by kneading with water, slurrying of the resultant paste with water, sedimenting of the coarse titanium dioxide particles and decanting from the sedimented fraction.

These processes for producing titania-pigmented polymers are still unsatisfactory and in need of further improvement.

It is an object of the present invention to provide a process whereby titania-pigmented polyamides having improved properties are obtained in a technically simple and economical manner.

We have found that this object is achieved by a process for producing a polyamide which contains titanium dioxide pigments, which comprises dispersing titanium dioxide pigments in a starting mixture containing water and caprolactam by means of an apparatus, said apparatus comprising a dispersing chamber, a disk-shaped rotor disposed in said dispersing chamber, a stator which has radial openings and is disposed in conjunction with said rotor in the dispersing zone of said dispersing chamber, a product inlet on each side of said rotor, each product inlet preferably having an axial channel section such that the confluence of the two product streams is disposed in the outer peripheral region of the rotor disk, and a product outlet at the outer periphery of said dispersing zone of said dispersing chamber, by feeding the titanium dioxide pigments through one of said product inlets and the starting mixture, containing water and caprolactam, through the other one of said product inlets, to said dispersing chamber, and obtaining a product mixture, containing water, caprolactam and titanium dioxide used, via said product outlet, and polymerizing said product mixture to a polyamide containing titanium dioxide pigments.

The present invention further provides polyamides obtainable by this process and for the use of such polyamides as a masterbatch for delustering or coloration of a polymer.

The process of the present invention relates to the production of a polyamide.

Polyamides are herein to be understood as being homopolymers, copolymers, blends and grafts of synthetic long-chain polyamides having recurring amide groups in the polymer main chain as an essential constituent. Examples of such polyamides are nylon-6 (polycaprolactam), nylon-6,6 (polyhexamethyleneadipamide), nylon-4,6(polytetramethyleneadipamide), nylon-6,10 (polyhexamethylenesebacamide), nylon-7 (polyenantholactam), nylon-11 (poly-undecanolactam), nylon-12 (polydodecanolactam). As well as polyamides known by the generic name of nylon, polyamides further include the aramids (aromatic polyamides), such as poly-meta-phenyleneisophthalamide (NOMEX® fiber, U.S. Pat. No. 3,287,324) or poly-para-phenyleneterephthalamide (KEVLAR® fiber, U.S. Pat. No. 3,671,542).

Polyamides can in principle be prepared by two methods.

In a polymerization from dicarboxylic acids and diamines and also in a polymerization from amino acids or their derivatives, such as aminocarbonitriles, aminocarboxamides, aminocarboxylate esters or aminocarboxylate salts, the amino and carboxyl end groups of the starting monomers or starting oligomers react with one another to form an amide group and water. The water can subsequently be removed from the polymer. In a polymerization from carboxamides, the amino and amide end groups of the starting monomers or starting oligomers react with one another to form an amide group and ammonia. The ammonia can subsequently be removed from the polymer. This polymerization reaction is customarily known as a polycondensation.

A polymerization from lactams as starting monomers or starting oligomers is customarily known as a polyaddition.

Such polyamides are obtainable by conventional processes, as described for example in DE-A-14 95 198, DE-A-25 58 480, EP-A-129 196 or in: Polymerization Processes, Interscience, New York, 1977, pages 424-467, especially pages 444-446, from monomers selected from the group consisting of lactams, omega-aminocarboxylic acids, omega-aminocarbonitriles, omega-aminocarboxamides, omega-aminocarboxylate salts, omega-aminocarboxylate esters, equimolar mixtures of diamines and dicarboxylic acids, dicarboxylic acid/diamine salts, dinitriles and diamines or mixtures thereof.

Useful monomers include monomers or oligomers of a $C_2$ to $C_{20}$, preferably $C_2$ to $C_{18}$, arylaliphatic or, preferably, aliphatic lactam such as enantholactam, undecanolactam, dodecanolactam or caprolactam, monomers or oligomers of $C_2$ to $C_{20}$, preferably $C_3$ to $C_{18}$, aminocarboxylic acids such as 6-aminocaproic acid or 11-aminoundecanoic acid, and dimers, trimers, tetramers, pentamers or hexamers thereof, and salts thereof such as alkali metal salts, for example lithium, sodium or potassium salts, $C_2$ to $C_{20}$, preferably $C_3$ to $C_8$, aminocarbonitriles such as 6-aminocapronitrile or 11-aminoundecanonitrile, monomers or oligomers of $C_2$ to $C_{20}$ amino acid amides such as 6-aminocapramide or 11-aminoundecaomide, and dimers, trimers, tetramers, pentamers or hexamers thereof, esters, preferably $C_1$-$C_4$ alkyl esters, such as methyl, ethyl, n-propyl, i-propyl, n-butyl, i-butyl or s-butyl esters, of $C_2$ to $C_{20}$, preferably $C_3$ to $C_{18}$, aminocarboxylic acids, such as 6-aminocaproic acid esters, for example methyl 6-aminocaproate, or 11-aminoundecanoic acid esters, for example methyl 11-aminoundecanoate, monomers or oligomers of a $C_2$ to $C_{20}$, preferably $C_2$ to $C_{12}$, alkyldiamine, such as tetramethylenediamine or, preferably, hexamethylenediamine, with a $C_2$ to $C_{20}$, preferably $C_2$ to $C_{14}$, aliphatic dicarboxylic acid or mono-or dinitriles thereof, such as sebacic acid, dodecanedioic acid, adipic acid, sebacic acid dinitrile, decanoic acid dinitrile or adiponitrile, and dimers, trimers, tetramers, pentamers or hexamers thereof, monomers or oligomers of a $C_2$ to $C_{20}$, preferably $C_2$ to $C_{12}$, alkyldiamine, such as tetramethylenediamine or, preferably, hexamethylenediamine, with a $C_8$ to $C_{20}$, preferably $C_8$ to $C_{12}$, aromatic dicarboxylic acid or derivatives thereof, for example chlorides, such as naphthalene-2,6-dicarboxylic acid, preferably isophthalic acid or terephthalic acid, and dimers, trimers, tetramers, pentamers or hexamers thereof, monomers or oligomers of a $C_2$ to $C_{20}$, preferably $C_2$ to $C_{12}$, alkyldiamine, such as tetramethylenediamine or, preferably, hexamethylenediamine, with a $C_9$ to $C_{20}$, preferably $C_9$ to $C_{18}$, arylaliphatic dicarboxylic acid or derivatives thereof, for example chlorides, such as o-, m-or p-phenylenediacetic acid, and dimers, trimers, tetramers, pentamers or hexamers thereof, monomers or oligomers of a $C_6$ to $C_{20}$, preferably $C_6$ to $C_{10}$, aromatic diamine, such as m-or p-phenylenediamine, with a $C_2$ to $C_{20}$, preferably $C_2$ to $C_{14}$, aliphatic dicarboxylic acid or mono-or dinitriles thereof, such as sebacic acid, dodecanedioic acid, adipic acid, sebacic acid dinitrile, decanoic acid dinitrile or adiponitrile, and dimers, trimers, tetramers, pentamers or hexamers thereof, monomers or oligomers of a $C_6$ to $C_{20}$, preferably $C_6$ to $C_{10}$, aromatic diamine, such as m-or p-phenylenediamine, with a $C_8$ to $C_{20}$, preferably $C_8$ to $C_{12}$, aromatic dicarboxylic acid or derivatives thereof, for example chlorides, such as naphthalene-2,6-dicarboxylic acid, preferably isophthalic acid or terephthalic acid, and dimers, trimers, tetramers, pentamers or hexamers thereof, monomers or oligomers of a $C_6$ to $C_{20}$, preferably $C_6$ to $C_{10}$, aromatic diamine, such as m-or p-phenylenediamine, with a $C_9$ to $C_{20}$, preferably $C_9$ to $C_{18}$, arylaliphatic dicarboxylic acid or derivatives thereof, for example chlorides, such as o-, m-or p-phenylenediacetic acid, and dimers, trimers, tetramers, pentamers or hexamers thereof, monomers or oligomers of a $C_7$ to $C_{20}$, preferably $C_8$ to $C_{18}$, arylaliphatic diamine, such as m-or p-xylylenediamine, with a $C_2$ to $C_{20}$, preferably $C_2$ to $C_{14}$, aliphatic dicarboxylic acid or mono-or dinitriles thereof, such as sebacic acid, dodecanedioic acid, adipic acid, sebacic acid dinitrile, decanoic acid dinitrile or adiponitrile, and dimers, trimers, tetramers, pentamers or hexamers thereof, monomers or oligomers of a $C_7$ to $C_{20}$, preferably $C_8$ to $C_{18}$, arylaliphatic diamine, such as m-or p-xylylenediamine, with a $C_6$ to $C_{20}$, preferably $C_6$ to $C_{10}$, aromatic dicarboxylic acid or derivatives thereof, for example chlorides, such as naphthalene-2,6-dicarboxylic acid, preferably isophthalic acid or terephthalic acid, and dimers, trimers, tetramers, pentamers or hexamers thereof, monomers or oligomers of a $C_7$ to $C_{20}$, preferably $C_8$ to $C_{18}$, arylaliphatic diamine, such as m-or p-xylylenediamine, with a $C_9$ to $C_{20}$, preferably $C_9$ to $C_{18}$, arylaliphatic dicarboxylic acid or derivatives thereof, for example chlorides, such as o-, m-or p-phenylenediacetic acid, and dimers, trimers, tetramers, pentamers or hexamers thereof, and homopolymers, copolymers, mixtures and grafts of such starting monomers or starting oligomers.

In a preferred embodiment, the lactam used is caprolactam, the diamine used is tetramethylenediamine, hexamethylenediamine or their mixtures and the dicarboxylic acid used is adipic acid, sebacic acid, dodecanedioic acid, terephthalic acid, isophthalic acid or mixtures thereof. Particular preference is given to the lactam being caprolactam, the diamine being hexamethylenediamine and the dicarboxylic acid being adipic acid or terephthalic acid or their mixtures.

Particular preference is given to those starting monomers or oligomers which on polymerization lead to the polyamides nylon-6, nylon-6,6, nylon-4,6, nylon-6,10, nylon-6,12, nylon-7, nylon-11 or nylon-12 or the aramids poly-meta-phenyleneisophthalamide or poly-para-phenyleneterephthalamide, especially to nylon-6 or nylon-6,6.

In a preferred embodiment, the polyamides may be prepared using one or more chain regulators. Useful chain regulators advantageously include compounds having one or more, such as two, three or four, preferably two in the case of systems in the form of fibers, amino groups reactive in polyamide formation or one or more, such as two, three or four, preferably two in the case of systems in the form of fibers, carboxyl groups reactive in polyamide formation.

The first case provides polyamides wherein said monomers used for preparing said polyamide have a higher number of amine groups, or their equivalents, used for forming said polymer chain than carboxylic acid groups, or their equivalents, used for forming said polymer chain.

The second case provides polyamides wherein said monomers used for preparing said polyamide have a higher number of carboxylic acid groups, or their equivalents, used for forming said polymer chain than amine groups, or their equivalents, used for forming said polymer chain.

Useful chain regulators advantageously include monocarboxylic acids, such as alkanecarboxylic acids, for example acetic acid, propionic acid, such as benzene-or naphthalene-monocarboxylic acid, for example benzoic acid, dicarboxylic acids, such as $C_4$-$C_{10}$-alkanedicarboxylic acid, for example adipic acid, azelaic acid, sebacic acid, dodecanedioic acid, $C_5$-$C_8$-cycloalkanedicarboxylic acids, for example cyclohexane-1,4-dicarboxylic acid, benzene-or naphthalenedicarboxylic acid, for example terephthalic acid, isophthalic acid, naphthalene-2,6-dicarboxylic acid, $C_2$ to $C_{20}$, preferably $C_2$ to $C_{12}$, alkylamines, such as cyclohexylamine, $C_6$ to $C_{20}$, preferably $C_6$ to $C_{10}$, aromatic monoamines, such as aniline, or $C_7$ to $C_{20}$, preferably $C_8$ to $C_{18}$, arylaliphatic monoamines, such as benzylamine, diamines, such as $C_4$-$C_{10}$-alkanediamines, for example hexamethylenediamine.

The chain regulators may be unsubstituted or substituted, for example by aliphatic groups, preferably $C_1$-$C_8$-alkyl groups, such as methyl, ethyl, i-propyl, n-propyl, n-butyl, i-butyl, s-butyl, n-pentyl, n-hexyl, n-heptyl, n-octyl, 2-ethylhexyl, OH, =O, $C_1$-$C_8$-alkoxy, COOH, $C_2$-$C_6$-carbalkoxy, $C_1$-$C_{10}$-acyloxy, or $C_1$-$C_8$-alkylamino, sulfonic acid or salts thereof, such as alkali or alkaline earth metal salts, cyano or halogens, such as fluorine, chlorine, bromine.

Examples of substituted chain regulators are sulfoisophthalic acid and alkali or alkaline earth metal salts thereof, such as lithium, sodium or potassium salts, sulfoisophthalic esters, for example with $C_1$-$C_{16}$-alkanols, or sulfoisophthalic acid mono- or diamides, especially with monomers suitable for forming polyamides and bearing at least one amine group, such as hexamethylenediamine or 6-aminocaproic acid.

A chain regulator may advantageously be used in amounts of not less than 0.01 mol %, preferably not less than 0.05 mol %, especially not less than 0.2 mol %, based on 1 mol of acid amide groups of the polyamide.

A chain regulator may advantageously be used in amounts of not more than 1.0 mol %, preferably not more than 0.6 mol %, especially not more than 0.5 mol %, based on 1 mol of acid amide groups of the polyamide.

Advantageously, the polyamide may contain a sterically hindered piperidine derivative attached to the polymer chain by chemical bonding. The polyamide may also contain mixtures of such sterically hindered piperidine derivatives.

Preferred sterically hindered piperidine derivatives are those of the formula

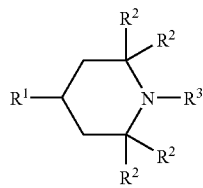

where $R^1$ is a functional group capable of amide formation with the polymer chain of the polyamide, preferably a group —(NH)$R^5$, in which $R^5$ is hydrogen or $C_1$-$C_8$ alkyl, or a carboxyl group, or a carboxyl derivative, or a group —(CH$_2$)$_x$(NH)$R^5$, in which x is 1 to 6 and $R^5$ is hydrogen or $C_1$-$C_8$ alkyl, or a group —(CH$_2$)$_y$COOH, in which y is 1 to 6, or a —(CH$_2$)$_y$COOH acid derivative, in which y is 1 to 6, especially a group —NH$_2$, $R^2$ is an alkyl group, preferably a $C_1$-$C_4$ alkyl group such as methyl, ethyl, n-propyl, i-propyl, n-butyl, i-butyl, s-butyl, t-butyl, especially a methyl group, $R^3$ is hydrogen, $C_1$-$C_4$ alkyl or O—$R^4$, in which $R^4$ is hydrogen or $C_1$-$C_7$ alkyl, $R^3$ being hydrogen in particular.

In such compounds, steric hindrance usually prevents the tertiary amino groups, and especially the secondary amino groups, of the piperidine ring system from reacting.

A particularly preferred sterically hindered piperidine derivative is 4-amino-2,2,6,6-tetramethylpiperidine.

The sterically hindered piperidine derivative may advantageously be used in amounts of not less than 0.01 mol %, preferably not less than 0.05 mol %, especially not less than 0.1 mol %, based on 1 mole of acid amide groups of the polyamide.

The sterically hindered piperidine derivative may advantageously be used in amounts of not more than 0.8 mol %, preferably not more than 0.6 mol %, especially not more than 0.4 mol %, based on 1 mol of acid amide groups of the polyamide.

Such polyamides which contain a sterically hindered piperidine derivative attached to the polymer chain by chemical bonding, and processes for the preparation of said polyamides are described for example in WO 95/28443, WO 97/05189, WO 98/50610, WO 99/46323, WO 99/48949, EP-A-822 275, EP-A-843 696 and the German applications 10030515.6, 10030512.1 and 10058291.5.

The process of the present invention relates to the production of polyamide pigmented with titanium dioxide.

The titanium dioxide may be used in any possible crystal form, such as anatase, rutile or brookite or mixtures thereof. Preference is given to anatase or rutile or mixtures thereof, especially anatase, although synthetic anatase may customarily contain small amounts of rutile, for example up to 5% by weight based on the total weight, as a result of the process used to produce it.

The specific BET surface area of the titanium dioxide is not critical per se, although as the BET surface area increases the reactivity of titanium dioxide, like the chalking action, generally increases and as the BET surface area decreases the average mean particle size generally increases.

For a titanium dioxide to be useful as a delusterant or colorant it should have not only a low chalking action but also a low particle size.

The best BET surface area for the particular polyamide and the particular application is easily determined by a few simple preliminary tests.

To reduce the chalking action of titanium dioxide, ie to reduce the photochemical activity with regard to any decomposition of the surrounding polyamide matrix, the titanium dioxide may be coated with compounds of other elements, for example the oxides, advantageously of manganese, iron, antimony, silicon or aluminum.

Such titanium dioxide pigments and their manufacture are generally known and suitable titanium dioxide pigments are commercially available.

According to the invention, titanium dioxide pigments are dispersed in a starting mixture containing water and caprolactam.

Advantageously, the starting mixture containing water and caprolactam should contain the water and caprolactam in a ratio in the range from 50/50 to 99/1, preferably in the range from 80/20 to 97/3, and especially in the range from 93/7 to 95/5 mass/mass.

The starting mixture may advantageously include a dispersing assistant.

Useful dispersing assistants include protective colloids and/or emulsifiers as described for example in Houben-Weyl, Methoden der Organischen Chemie, Vol. XIV/1, Makromolekulare Stoffe, Georg-Thieme-Verlag, Stuttgart, 1961, pp. 411-420 and pp. 192-208, more preferably Na$_2$HPO$_4$ (eg disodium hydrogenphosphate—12 Hydrate; Chem. Werke Budenheim) and also sodium salts of modified polyacrylic acids having an average molecular weight of about 4000 (eg Sokalan PA 20 PN; BASF) or mixtures thereof.

The dispersing assistant may preferably be used in amounts from 0.01 to 5.0% and especially from 0.1 to 1.0% by weight, based on starting mixture.

The starting mixture may in a preferred embodiment, as well as caprolactam, contain further of the abovementioned polyamide-forming monomers, chain regulators or piperidine derivatives or mixtures thereof.

In a further preferred embodiment, the starting mixture contains caprolactam as sole polyamide-forming monomer. In a particularly preferred embodiment, the starting mixture contains none of the piperidine derivatives mentioned. In a particularly preferred embodiment, the starting mixture contains none of the chain regulators mentioned.

The process of the present invention may utilize titanium dioxide pigment and the starting mixture in a ratio in the range from 1/99 to 50/50, preferably in the range from 10/90 to 40/60, and especially in the range from 15/85 to 25/75 mass/mass.

According to the invention, titanium dioxide pigments are dispersed in the starting mixture by means of an apparatus, said apparatus comprising a dispersing chamber, a disk-shaped rotor disposed in said dispersing chamber, a stator which has radial openings and is disposed in conjunction with said rotor in the dispersing zone of said dispersing chamber, a product inlet on each side of said rotor, each product inlet preferably having an axial channel section such that the confluence of the two product streams is disposed in the outer peripheral region of the rotor disk, and a product outlet at the outer periphery of said dispersing zone of said dispersing chamber.

An apparatus of this kind is known per se. Preferred embodiments of suitable apparatus are described in WO 92/21436 and especially preferred embodiments of suitable apparatus in WO 01/87474, the content of both documents being incorporated herein by reference.

Suitable apparatus is commercially available, for example the TDS or preferably Conti-TDS machines from Ystral GmbH Maschinenbau+Processtechnik, Germany.

A product mixture is obtained according to the invention by feeding the titanium dioxide pigments through one of said product inlets and the starting mixture, containing water and caprolactam, through the other one of said product inlets, to said dispersing chamber, and obtaining a product mixture, containing water, caprolactam and the titanium dioxide pigment used, via said product outlet.

The best operating parameters for the particular type of machine and the particular product composition desired are easily determined by a few simple preliminary tests.

According to the invention, the product mixture is polymerized to a polyamide containing titanium dioxide pigments.

The polymerization may advantageously be carried out according to one of the processes mentioned above for the production of polyamides.

In an advantageous embodiment, the product mixture may be stored prior to the polymerization, for example in a settling vessel, in which case delay times in the range from 1 to 100 hours and especially in the range from 10 to 50 hours are suitable, in order that any comparatively coarse titanium dioxide pigments present in the product mixture may be allowed to sediment out.

After sedimenting, the mixture destined for the polymerization can be taken off from the surface, such as by pumping off. The sediment may advantageously be returned into the dispersing stage. In a further preferred embodiment, the polymerization may be preceded by reducing the water content of the product mixture, especially after the sedimentation of the comparatively coarse titanium dioxide pigments, in a conventional manner, as by evaporation. Furthermore, in a preferred embodiment, the monomer content of the product mixture may be increased prior to the polymerization, by adding further monomer, such as caprolactam. The removal of water and the addition of further monomer may be combined, in which case the water may be removed before, after or during, preferably before, the monomer is added.

In a preferred embodiment, the levels of titanium dioxide, polyamide-forming components and water may be set such that the product obtained is a titania-pigmented polyamide in which the titania content is in the range from 1 to 50%, preferably in the range from 5 to 45% and especially in the range from 8 to 40% by weight, based on total weight.

The polyamides obtainable by the process according to the present invention may advantageously be used as a masterbatch for delustering or coloration of a polymer. What is contemplated here in particular is the addition of the masterbatch in molten form to a main stream which contains polymer-forming monomers, such as caprolactam in the case of nylon-6, during the polymerization. It is similarly preferable to add the masterbatch to a polymer which differs from that of the masterbatch, for example by coextrusion or mixing in as a melt.

In principle, the titania-pigmented polyamides of the present invention may be incorporated into polymers by methods known per se for the incorporation of titania-pigmented polyamides into polymers.

The process of the present invention has the advantage that the titanium dioxide pigments present in the polyamide have a mean average particle size <1.2 µm, as measured by optical microscopy on thin sections, and hence are smaller than the particle size in polyamides produced by the prior art.

Further advantages of the process according to the present invention may be discerned from the examples.

EXAMPLES

Production of Masterbatches

Inventive Example 1

A water ring pump (Conti-TDS, from Ystral GmbH Maschinenbau und Processtechnik, Germany), was used to convert 1 000 kg/h of titanium dioxide (Hombitan LOCR-SM, from Sachtleben Chemie GmbH, Duisburg), and 4 100 kg/h of a mixture containing 93.8% of water, 6.0% by weight of caprolactam and 0.2% of dispersant (Sokalan PA 20 PN, from BASF AG), to a suspension over 2 h and transfer it into a stirred vessel and recirculate it therein by means of a ring line.

The suspension was then transferred into a settling vessel and the comparatively coarse titanium dioxide particles were allowed to sediment for 48 hours.

3.5 $m^3$ of suspension were then pumped off the surface of the settling vessel into a stock reservoir vessel. 5 $m^3$ from the stock reservoir vessel were added over 5 h to 2 300 l of liquid caprolactam at a temperature of 125° C. and a pressure of 0.5 bar, while water introduced with the suspension evaporated. As a result, the temperature of the melt rose as high as 152° C.

Thereafter, the suspension was transferred into a second, Diphyl-heated vessel and heated to 257° C. at a constant vessel pressure of 6 bar by further evaporation of water.

The pressure was then lowered from 6 bar to 0.03 bar over 35 min.

After nitrogen blanketing, the melt was fed to an underwater pelletizer and the pellets were dried.

Inventive Example 2

Inventive example 1 was repeated except that 2 $m^3$ of titania-containing suspension were used instead of 5 $m^3$ and 2 300 l of caprolactam instead of 3 200 l.

Comparative Example

A titania-containing polyamide was produced as per the example of EP-A-070 452.

Processing of Masterbatches a) Filtration

The titania-containing polyamides obtained in inventive example 1, inventive example 2 and the comparative example were blended with caprolactam and polymerized as per EP-A-070452 such that a polyamide having a titanium dioxide content of 1.6% by weight, based on total weight, was obtained. The polyamides obtained by masterbatch as per inventive examples 1 and 2 are hereinafter referred to as polyamides 1 and 2 respectively, while the polyamide obtained using the masterbatch as per the comparative example will be referred to as the comparative polyamide.

The mixtures were each filtered six times in the melt at 262° C. at a throughput of 3.7 g/min through a nonwoven filter having an average mean pore size of 10 μm in the course of 12 hours.

The average mean pressure build-up, determined as a difference between the final pressure and the initial pressure upstream of the filter, divided by the amount put through, was about 7 bar/kg for each of polyamides 1 and 2, while the pressure build-up in the case of the comparative polyamide was 10 bar/kg.

b) Abrasion

Polyamides 1 and 2 and the comparative polyamide were each used to spin a 44 dtex 12 filament yarn.

50 km of the yarn were pulled twice over a sheet of copper (curvature: 90°, pulling force: 2 cN; speed: 150 m/min).

The yarn formed from polyamides 1 and 2 had an average abrasion of 3.8 mg/100 km of yarn, while the yarn formed from the comparative polyamide had an abrasion of 4.2 mg/100 km.

We claim:

1. A process for producing a polyamide with titanium dioxide pigments, comprising:
    dispersing the titanium dioxide pigments in a mixture containing water and caprolactam with an apparatus, said apparatus comprising
        a dispersing chamber,
        a disk-shaped rotor disposed in said dispersing chamber,
        a stator which has radial openings and is disposed in conjunction with said rotor in a dispersing zone of said dispersing chamber,
        a product inlet on each side of said rotor, such that a confluence of two product streams from each of the product inlets is disposed in an outer peripheral region of the disk-shaped rotor, and
        a product outlet at the outer periphery of said dispersing zone of said dispersing chamber,
    by feeding the titanium dioxide pigments through one of said product inlets and the mixture, containing water and caprolactam, through the other said product inlet to said dispersing chamber, and obtaining a product mixture, containing water, caprolactam and the titanium dioxide pigment from said product outlet, and
    polymerizing said product mixture to form the polyamide containing titanium dioxide pigments and wherein water is removed from the product mixture before or during the polymerization, blending said product mixture with additional caprolactam followed by polymerizing the additional caprolactam to form a masterbatch and filtering the masterbatch in a melt through a filter,
    wherein an average mean pressure build-up of the polymerized masterbatch, determined as a difference between a final pressure and an initial pressure upstream of the filter, divided by an amount put through, is about 7 bar/kg.

2. The process of claim 1, wherein the mixture containing water and caprolactam further comprises a dispersing assistant.

3. The process of claim 1, wherein additional caprolactam is added to the product mixture before or during the polymerization.

4. The process of claim 1, wherein the product inlets have an axial channel section.

5. The process of claim 1, wherein the titanium dioxide pigments have a mean average particle size of less than 1-2 microns as measured by optical microscopy.

6. The process of claim 1, wherein the mixture containing water and caprolactam has a weight ratio of water:caprolactam from 1:1 to 99:1.

7. The process of claim 6, wherein the ratio of water:caprolactam is from 4:1 to 97:3.

8. The process of claim 1, wherein the mixture containing water and caprolactam and the titanium dioxide pigments is added to each of the product inlets in a weight ratio of pigment:mixture from 1:99 to 1:1.

9. The process of claim 8, wherein the ratio of pigment:mixture is from 15:85 to 1:3.

10. The polyamide containing titanium dioxide pigments obtained by the process of claim 1
    wherein an amount of titanium dioxide pigments in the product mixture ranges from 1 to 50% based on a total weight of the product mixture, and
    wherein the titanium dioxide pigments have a mean average particle size of less than 1.2 microns.

11. The polyamide of claim 10, wherein the amount of titanium dioxide pigments in the product mixture ranges from 5 to 45% by weight based on total the total weight of the product mixture.

12. The polyamide of claim 10, wherein the amount of titanium dioxide pigments in the product mixture ranges from 8 to 40% by weight based on total the total weight of the product mixture.

13. The polyamide of claim 10, wherein the product mixture comprises a dispersing assistant.

14. The polyamide of claim 13, wherein an amount of the dispersing assistant ranges from 0.1 to 1.0% by weight.

15. The polyamide of claim 13, wherein the amount of water is 93.8% by weight, the amount of caprolactam is 6.0% by weight, and the amount of dispersing assistant is 0.2% by weight.

* * * * *